United States Patent
Han et al.

(12)

(10) Patent No.: US 10,530,215 B2
(45) Date of Patent: Jan. 7, 2020

(54) MOTOR DRIVEN PUMP AND JUNCTION BOX

(71) Applicant: Hefei Xinhu Canned Motor Pump CO., LTD., Hefei (CN)

(72) Inventors: Yuanping Han, Wenling (CN); Yan He, Hefei (CN); Jiao Zhou, Shangluo (CN); Zhi Hu, Anqing (CN)

(73) Assignee: HEFEI XINHU CANNED MOTOR PUMP CO., LTD., Hefei (CN)

( * ) Notice: Subject to any disclaimer, the term of this patent is extended or adjusted under 35 U.S.C. 154(b) by 327 days.

(21) Appl. No.: 15/352,613

(22) Filed: Nov. 16, 2016

(65) Prior Publication Data

US 2017/0302125 A1     Oct. 19, 2017

(30) Foreign Application Priority Data

Apr. 19, 2016  (CN) .......................... 2016 2 0340349

(51) Int. Cl.
| H02K 5/22 | (2006.01) |
| H02K 11/33 | (2016.01) |
| F25B 31/02 | (2006.01) |

(52) U.S. Cl.
CPC ............ H02K 5/22 (2013.01); F25B 31/026 (2013.01); H02K 11/33 (2016.01); H02K 5/225 (2013.01)

(58) Field of Classification Search
CPC ..................................................... H02K 11/33
USPC ....................................................... 310/71
See application file for complete search history.

(56) References Cited

U.S. PATENT DOCUMENTS

| 5,861,689 A * | 1/1999 | Snider ................... H02K 3/522 310/71 |
| 6,132,184 A * | 10/2000 | Robertson ............... F04D 13/06 417/366 |
| 6,831,382 B1 * | 12/2004 | Lyle ........................ H02K 5/04 310/12.13 |
| 2002/0109425 A1 * | 8/2002 | Modi ....................... H02K 5/15 310/89 |
| 2003/0214191 A1 * | 11/2003 | Watzek .................. H02K 3/525 310/80 |
| 2004/0037719 A1 * | 2/2004 | Sunaga ................. F04D 13/064 417/423.8 |
| 2006/0108884 A1 * | 5/2006 | Shiino ..................... B60T 8/267 310/89 |
| 2007/0222329 A1 * | 9/2007 | Bin ........................ H02K 3/525 310/257 |
| 2008/0067883 A1 * | 3/2008 | Witt ....................... H02K 16/00 310/71 |
| 2008/0164784 A1 * | 7/2008 | Huang .................... H02K 5/08 310/49.01 |

(Continued)

Primary Examiner — Jue Zhang
Assistant Examiner — David A. Singh
(74) Attorney, Agent, or Firm — Gokalp Bayramoglu (57) ABSTRACT

A pump is provided with a motor arranged in a stator case, wherein a junction box is arranged at one axial end of the stator case, the junction box is provided with a tubular shell component, the first axial end of the tubular shell component is placed at the axial end of the stator case, the opposite second axial end of the tubular shell component is sealed through at least one cover piece, an operation display circuit board and a motor driving circuit board are arranged in the tubular shell component. The tubular shell component and the containing box are not provided with conductive contact pins.

10 Claims, 5 Drawing Sheets

(56) References Cited

U.S. PATENT DOCUMENTS

| | | | | |
|---|---|---|---|---|
| 2009/0133955 | A1* | 5/2009 | Morikawa | B62D 5/0406 |
| | | | | 180/444 |
| 2010/0090635 | A1* | 4/2010 | Andersen | F04D 29/628 |
| | | | | 318/490 |
| 2010/0111729 | A1* | 5/2010 | Andersen | H02K 3/50 |
| | | | | 417/423.7 |
| 2011/0095629 | A1* | 4/2011 | Lee | H02K 5/225 |
| | | | | 310/71 |
| 2012/0104907 | A1* | 5/2012 | Zeng | H02K 11/33 |
| | | | | 310/68 R |
| 2015/0188381 | A1* | 7/2015 | Vohlgemuth | H02K 5/225 |
| | | | | 310/71 |
| 2015/0238689 | A1* | 8/2015 | Shimizu | A61M 5/14228 |
| | | | | 604/508 |
| 2015/0295478 | A1* | 10/2015 | Creviston | H02K 11/0094 |
| | | | | 310/68 D |
| 2015/0349604 | A1* | 12/2015 | Wallace | H02K 5/225 |
| | | | | 310/68 A |
| 2016/0006316 | A1* | 1/2016 | Modi | H02K 5/22 |
| | | | | 310/43 |
| 2016/0198581 | A1* | 7/2016 | Caille | H02G 3/123 |
| | | | | 174/50 |
| 2017/0117770 | A1* | 4/2017 | Wu | H02K 5/10 |

* cited by examiner

MOTOR DRIVEN PUMP AND JUNCTION BOX

CROSS REFERENCE TO RELATED APPLICATIONS

This application claims priority to a China Application NO.ZL201620340349.4, filed on Apr. 19, 2016, the entire contents of which are incorporated herein by reference.

TECHNICAL FIELD

The utility model relates to a pump component provided with a motor.

BACKGROUND

A pump component, such as a pump component serving as a heat cycle pump, driven by a motor is generally provided with a pump case, a stator case is arranged on the pump case, and the motor used for driving an impeller arranged in the pump case is arranged in the stator case. A junction box is generally arranged on the stator case, and an electric connecting piece and an electronic or electric element used for controlling and or adjusting the motor are contained in the junction box. It is commonly known that the junction box is fixed to an axial side (namely the end, away from the pump case, of the stator case). In addition, display elements and operation elements which are used for controlling and setting the pump component are generally arranged in the junction box.

However, the arrangement position of the electric connecting piece of the pump component of the above structure is unreasonable, and the electric connecting piece cannot be connected with a wiring component conveniently; the electric connecting piece and the junction box in the prior art are formed integrally, so that core-pulling demolding is inconvenient, the production difficulty is increased, and the production cost is increased.

Although, in the existing patent application of the prior art, an electric connecting piece is independently arranged on the side portion of a junction box, the way of arranging the electric connecting piece on the side portion is also unreasonable; conductive contact pins are integrated in the junction box, and thus processing and production are inconvenient.

For this reason, the utility model provides a pump component with an electric connecting piece arranged on the side portion of a unction box from another point of view.

SUMMARY OF THE UTILITY MODEL

The utility model aims to overcome the disadvantages and defects of existing pump components and provides a pump component which is reasonable structure and convenient to produce and assemble for solving the problems.

The following technical scheme is adopted by the utility model for solving the technical problems:

A pump component is provided with a motor arranged in a stator case, wherein a junction box is arranged at one axial end of the stator case, the junction box is provided with a tubular shell component, the first axial end of the tubular shell component is placed at the axial end of the stator case, the opposite second axial end of the tubular shell component is sealed through at least one cover piece, an operation display circuit board and a motor driving circuit board which is conductively connected with the operation display circuit board and controls the motor to operate are arranged in the tubular shell component, and the cover piece is provided with a plurality of operation elements and display holes; the pump component is characterized in that a slot notch is formed in the outer side of the stator case, a containing box used for containing an electric connecting piece is arranged on the side portion of the tubular shell component, and the containing box is provided with at least one line inlet and further provided a side socket correspondingly matched with the slot notch and a side notch communicating with an inner cavity of the tubular shell component; during assembling, the electric connecting piece is fixed in the containing box, a first connecting plug pin of the electric connecting piece is conductively connected with the motor after penetrating through the side socket and the slot notch, and a second connecting plug pin of the electric connecting piece extends into the inner cavity of the tubular shell component after penetrating through the side notch and then is conductively connected with the motor driving circuit board in the tubular shell component.

In one preferred embodiment of the utility mode, the slot notch is formed in the outer side of the axial end, close to the tubular shell component, of the stator case.

In one preferred embodiment of the utility mode, the two sides of the slot notch are provided with sliding strips in the axial direction of the stator case, and sliding grooves matched with the sliding strips are formed in the two sides of the outer surface of the side socket of the containing box.

In one preferred embodiment of the utility mode, the tubular shell component and the containing box are formed integrally.

In one preferred embodiment of the utility mode, a limiting sleeve arranged on the second connecting plug pin of the electric connecting piece in a sleeving mode to prevent the second connecting plug pin from sliding out of the inner cavity of the tubular shell component is arranged in the inner cavity of the tubular shell component.

In one preferred embodiment of the utility mode, the electric connecting piece is provided with a plurality of electric contacts, a power line interface and a signal line interface, one of the multiple electric contacts is a grounding contact connected with the stator case and is conductively connected with a grounding connecting piece arranged on the stator case and extending to the bottom of the inner cavity of the tubular shell component, the other electric contacts of the multiple electric contacts form the first connecting plug pin and the second connecting plug pin correspondingly, and the first connecting plug pin and the second connecting plug pin are arranged perpendicularly.

In one preferred embodiment of the utility mode, three line inlets are formed in the outer surface of the containing box, two line inlets are formed in the two opposite side faces of the containing box correspondingly, and the other line inlet is formed in the bottom surface of the containing box.

In one preferred embodiment of the utility mode, a detachable box cover is arranged on the side, backing onto the stator case, of the containing box.

In one preferred embodiment of the utility mode, a strong-weak electric partition board is arranged between the operation display circuit board and the motor driving circuit board.

In one preferred embodiment of the utility mode, a liquid crystal display is arranged on the operation display circuit board.

By the adoption of the technical scheme of the utility model, the arrangement position of a traditional electric connecting piece is changed, and assembling is convenient;

the electric connecting piece is installed in the containing box simply after the tubular shell component s installed at the tail end of the stator case, the motor driving circuit board, the operation display circuit board, the cover piece and other components are installed finally, and the assembling efficiency is greatly improved; in addition, the tubular shell component and the containing box are not provided with conductive contact pins, so that the processing difficulty is greatly lowered, the production efficiency is improved, and the production cost is reduced.

BRIEF DESCRIPTION OF THE DRAWINGS

For a clearer description of the embodiments of the utility model or the technical scheme in the prior art, a simple introduction of the drawings required in the description of the embodiments or the prior art is given as follows; obviously, the drawings in the following description are only several embodiments of the utility model, and for those skilled in the field, other drawings can also be obtained according to the following drawings without creative labor.

DETAILED DESCRIPTION OF THE UTILITY MODEL

For easily understanding the technical means, creative characteristics, purposes and effects achieved by the utility model, a further explanation of the utility model is given as follows.

Figure 1:
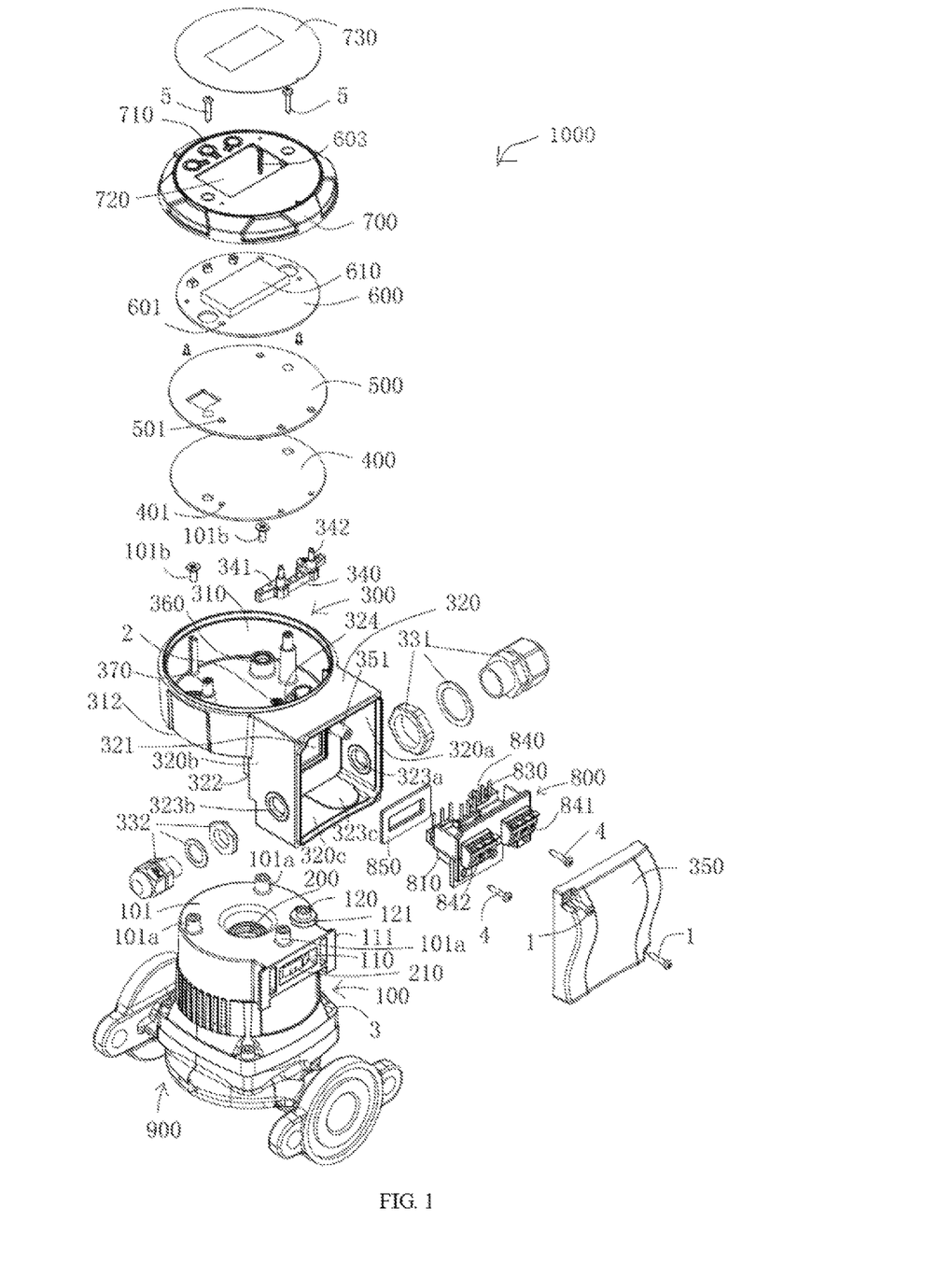
FIG. 1 is a structure explosive view of one embodiment of the utility model seen from a first viewing direction.
Figure 2:
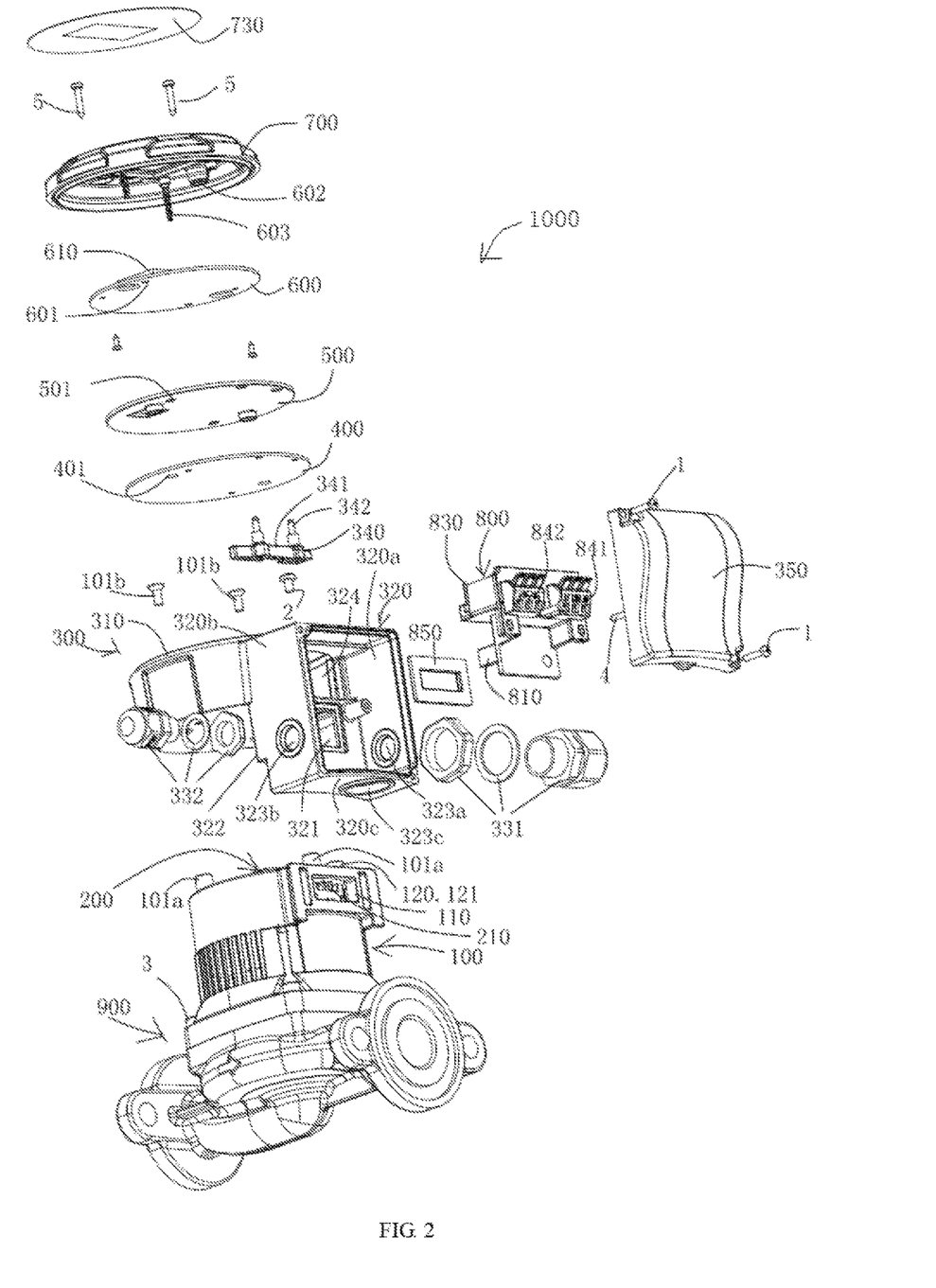
FIG. 2 is a structure explosive view of one embodiment of the utility model seen from a second viewing direction.
Figure 3:
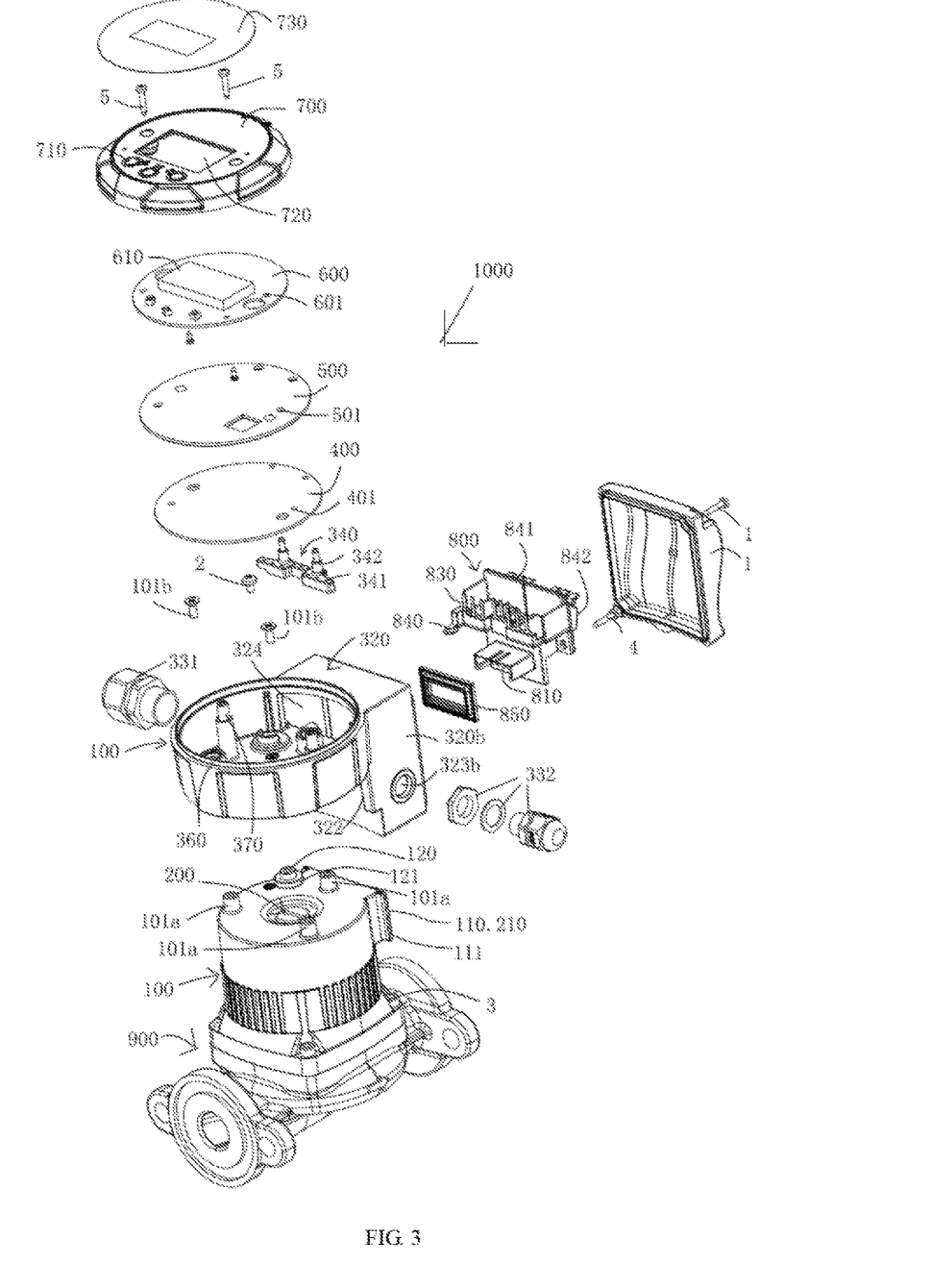
FIG. 3 is a structure explosive view of one embodiment of the utility model seen from a third viewing direction.
Figure 4:
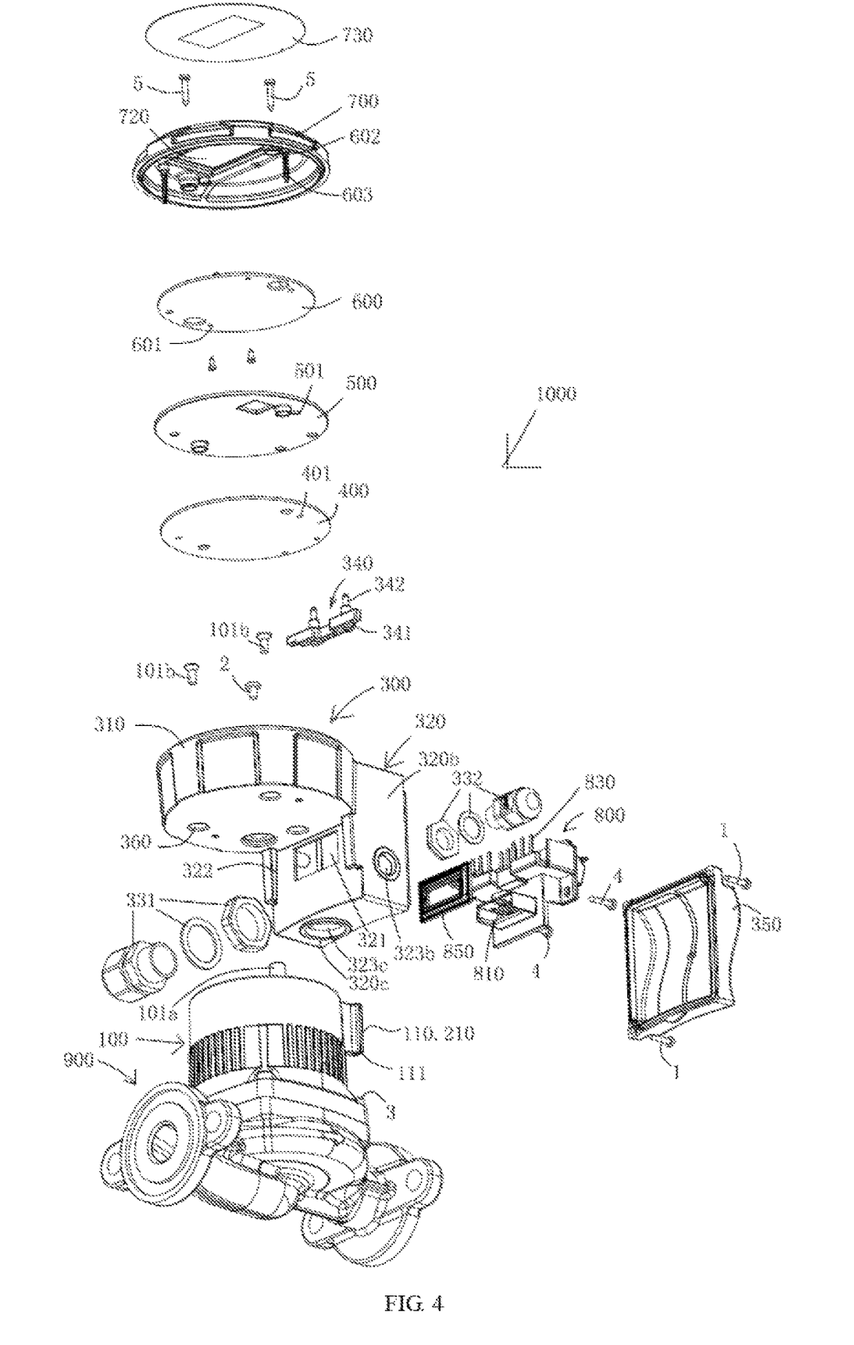
FIG. 4 is a structure explosive view of one embodiment of the utility model seen from a fourth viewing direction.
Figure 5:
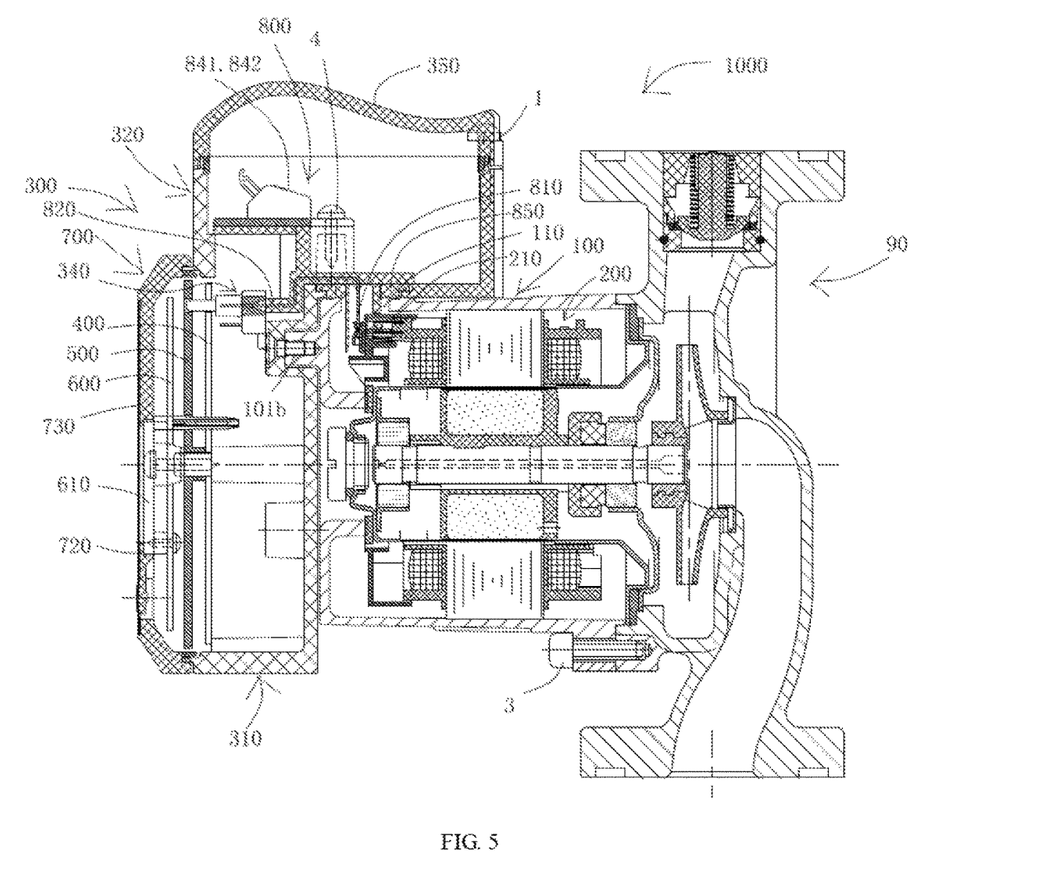
FIG. 5 is a section view of one embodiment of the utility mode after assembling.

Please see FIG. 1 to FIG. 5, pump component 1000 is provided with motor 200 arranged in stator case 100, wherein junction box 300 is arranged at one axial end 101 (corresponding to the left end of stator case 100 in FIG. 5 of the embodiment) of stator case 100. Junction box 300 is provided with tubular shell component 310, first axial end 312 (corresponding to the right end of tubular shell component 310 in FIG. 5 of the embodiment) of tubular shell component 310 is placed at axial end 101 of stator case 100, and first axial end 312 of tubular shell component 310 and axial end 101 of stator case 100 are fixed through a plurality of positioning screw holes 101*a* and screws 101*b*. The opposite second axial end of tubular shell component 310 is sealed through cover piece 700.

Operation display circuit board 600 and motor driving circuit board 400 are arranged in tubular shell component 310, operation display circuit board 600 is closely attached to cover piece 700, and motor driving circuit board 400 is closely attached to operation display circuit board 600; in addition, plug pins (not shown in FIGS) of motor driving circuit board 400 are inserted into plug pin grooves (not shown in FIGS) of operation display circuit board 600, and thus conductive connection between motor driving circuit board 400 and operation display circuit board 600 is achieved. For realizing strong-weak electric isolation, strong-weak electric partition board 500 is arranged between operation display circuit board 600 and motor driving circuit board 400 in the embodiment. For conveniently positioning and installing operation display circuit board 600, strong-weak electric partition board 500 and motor driving circuit board 400, a plurality of positioning guide columns 603 penetrating through holes 601 of operation display circuit board 600, holes 501 of strong-weak electric partition board 500 and holes 401 of motor driving circuit board 400 and a plurality of screw counter bores 602 are arranged on the end face of the inner side of cover piece 600. Cover piece 700 is provided with a plurality of operation elements 710 and display holes 720, operation display circuit board 600 can be triggered through operation elements 710, and display holes 720 can display an operation result of operation display circuit board 600 through liquid crystal display 610. Dustproof mark labels 730 are arranged on operation elements 710 and display holes 720 of cover piece 700. Operation elements 710 in the embodiment can be buttons. For connecting and positioning cover piece 700 and junction box 300 more conveniently, sliding grooves are formed in the periphery of cover piece 700, and annular sliding strips matched with the sliding grooves are arranged on the outer circumferential surface of tubular shell component 310.

Slot notch 110 is formed in the outer side of stator case 100, and slot notch 110 in the embodiment is formed in the outer side of the axial end, close to tubular shell component 310, of stator case 100. Containing box 320 used for containing electric connecting piece 800 is arranged on the side portion of tubular shell component 310; electric connecting piece 800 in the embodiment is provided with a plurality of electric contacts, power line interface 841 and signal line interface 842, one of the multiple electric contacts is grounding contact 830 connected with stator case 100 and is conductively connected with grounding connecting piece 120 arranged on stator case 100 and extending to the bottom of an inner cavity of tubular shell component 310, grounding contact 830 and grounding connecting piece 120 are connected through grounding screws 2, the other electric contacts of the multiple electric contacts form first connecting plug pin 810 and second connecting plug pin 820 correspondingly, and first connecting plug pin 810 and second connecting plug pin 820 are arranged perpendicularly. Electric connecting piece 800 certainly can also be other electric connecting pieces, such as connecting terminals or connecting cable, which easily occur to those skilled in the field.

Containing box 320 is provided with at least one line inlet for conveniently selecting a line inlet position according to the working condition of a field, the outer surface of containing box 320 in the embodiment is provided with three line inlets 323*a*, 323*b* and 323*c*, wherein two line inlets 323*a* and 323*b* are formed in the two opposite side faces 320*a* and 320*b* of containing box 320 correspondingly, and other lure inlet 323*c* is formed in bottom surface 320*c* of containing box 320; line inlets 323*a* and 323*b* are used as signal line inlets, sealing guide sleeve component 331 is arranged on a power line inlet, and sealing guide sleeve components 332 are arranged on the signal line inlets. For convenient maintenance, detachable box cover 350 is arranged on the side, backing onto stator case 100, of containing box 320 and fixed through screws 1 screwed in positioning screw holes 351 of an inner cavity of containing box 320. Containing box 320 is further provided with side socket 321 correspondingly matched with slot notch 110 and side notch 324 communicating with the inner cavity of tubular shell component 310. The first connecting plug pin 810 is conductively connected with conductive slot 210 formed in one side of the top of motor 200 after penetrating through side socket 321 and slot notch 110, and the second connecting plug pin 820 extends into the inner cavity of tubular shell component 310 after penetrating through side notch 324 and then is conductively connected with a plug pin groove (not shown in FIGS) of motor driving circuit board 400 in tubular shell component 310.

For convenient production, tubular shell component 310 and containing box 320 are integrally formed by insulating materials through injection molding.

For conveniently assembling and positioning tubular shell component 310, containing box 320 and stator case 100, the two sides of slot notch 110 in the embodiment are provided with sliding strips 111 in the axial direction of stator case 100, and sliding grooves 322 matched with sliding strips 111 are formed in the two sides of the outer surface of side socket 321 of containing box 320.

Limiting sleeve 340 arranged on second connecting plug pin 820 of electric connecting piece 800 in a sleeving mode to prevent the second connecting plug pin 820 from sliding out of the inner cavity of tubular shell component 310 is arranged in the inner cavity of tubular shell component 310 in the embodiment, and limiting sleeve 340 is provided with a plurality of holes 341 allowing the second connecting plug pin 820 to penetrate through and a pair of limiting columns 342 limited on the inner surface of side notch 324.

For guaranteeing the connection airtightness between tubular shell component 310 and stator case 100 as well as between the first connecting plug pin 810 and stator case 100, the periphery of grounding connecting piece 120 is sleeved with sealing ring 121, and the outer circumferential surface of the first connecting plug pin 810 is provided with sealing ring 850.

The assembling process of the utility model is as follows:

Motor 200 is assembled in stator case 100 firstly, and then stator case 100 and pump body 900 are fixedly connected through screws 3. Then, sliding strips 111 are slidably inserted into sliding grooves 322 of containing box 320. At the moment, the first axial end 312 of tubular shell component 310 is placed at axial end 101 of stator case 100, and the first axial end 312 of tubular shell component 310 and axial end 101 of stator case 100 are fixed through a plurality of positioning screw holes 101a, guide holes 360 and screws 101b. Conductive slot 210, slot notch 110 and side socket 321 on one side of the top of motor 200 are in one-to-one correspondence at the moment, the first connecting plug pin 810 of electric connecting piece 800 is inserted into conductive slot 210, the second connecting plug pin 820 extends into the inner cavity of tubular shell component 310, then grounding contact 830 and grounding connecting piece 120 are fixed through grounding screws 2, limiting sleeve 340 is arranged on the second connecting plug pin 820 in the sleeving mode simultaneously, electric connecting piece 800 is fixed in containing box 320 through screws 4, and detachable box cover 350 covers containing box 320 soon afterwards and is fixed through screws 1. Afterwards, cover piece 700, display circuit board 600, strong-weak electric partition board 500 and motor driving circuit board 400 which are preassembled together are arranged at the opposite second axial end of tubular shell component 310 in a covering mode and fixed through screws 5 sequentially screwed on connecting columns 370 on cover piece 700, display circuit board 600, strong-weak electric partition board 500, motor driving circuit board 400 and tubular shell component 310. At the moment, the second connecting plug pin 820 is conductively connected with the plug pin groove of motor driving circuit board 400, and finally dustproof mark labels 730 are attached, so that assembling is completed.

According to the utility model, the arrangement position of the traditional electric connecting piece is changed, and assembling is convenient; electric connecting piece 800 is installed in containing box 320 simply after tubular shell component 310 is installed at the tail end of stator case 100, the motor driving circuit board, the operation display circuit board, the cover piece and other components are installed finally, and the assembling efficiency is greatly improved; in addition, tubular shell component 310 and containing box 320 are not provided with conductive contact pins, so that the processing difficulty is greatly lowered, the production efficiency is improved, and the production cost is reduced.

The above description shows and describes the basic principle and main characteristics of the utility model as well as the advantages of the utility model. It should known by those skilled in the field that the utility model is not limited to the above embodiments. Only the principle of the utility model is described in the above embodiments and description, various changes and improvements of the utility model can be made without deviating from the spirit and scope of the utility model, and all the changes and improvements are within the required protection scope of the utility model. The required protection scope of the utility model is determined according to the attached claims and equivalents of the claims.

What is claimed is:

1. A pump component, comprising: a motor, a stator case, a junction box, a tubular shell component, an operation display circuit board, a motor driving circuit board, a cover piece, and a containing box, wherein the motor is arranged in the stator case, the junction box is arranged at one axial end of the stator case, the junction box is provided with the tubular shell component, a first axial end of the tubular shell component is placed at the one axial end of the stator case, an opposite second axial end of the tubular shell component is sealed through at least one cover piece, the operation display circuit board and the motor driving circuit board which is conductively connected with the operation display circuit board and controls the motor to operate are arranged in the tubular shell component, and the cover piece is provided with a plurality of operation elements and display holes; wherein a slot notch is formed in the outer side of the stator case, the containing box containing an electric connecting piece is arranged on the side portion of the tubular shell component, the containing box is provided with at least one line inlet, the containing box is further provided with a side socket correspondingly matched with the slot notch and a side notch communicating with an inner cavity of the tubular shell component, the electric connecting piece is fixed in the containing box, a first connecting plug pin of the electric connecting piece is conductively connected with the motor after penetrating through the side socket and the slot notch, and a second connecting plug pin of the electric connecting piece extends into the inner cavity of the tubular shell component after penetrating through the side notch and then is conductively connected with the motor driving circuit board in the tubular shell component.

2. The pump component according to claim 1, wherein the slot notch is formed in the outer side of the one axial end, close to the tubular shell component, of the stator case.

3. The pump component according to claim 1, wherein the two sides of the slot notch are provided with sliding strips in the axial direction of the stator case, and sliding grooves matched with the sliding strips are formed in the two sides of the outer surface of the side socket of the containing box.

4. The pump component according to claim 1, wherein the tubular shell component and the containing box are formed integrally.

5. The pump component according to claim 1, wherein a limiting sleeve arranged on the second connecting plug pin of the electric connecting piece in a sleeving mode to prevent the second connecting plug pin form sliding out of the inner cavity of the tubular shell component is arranged in the inner cavity of the tubular shell component.

6. The pump component according to claim 1, wherein the electric connecting piece is provided with multiple electric contacts, a power line interface and a signal line interface, one of the multiple electric contacts is a grounding contact connected with the stator case and is conductively connected with a grounding connecting piece arranged on the stator case and extending to the bottom of the inner cavity of the stator case, the other electric contacts of the multiple electric contacts form the first connecting plug pin and the second connecting plug pin correspondingly, and the first connecting plug pin and the second connecting plug pin are arranged perpendicularly.

7. The pump component according to claim 6, wherein three line inlets are formed in the outer surface of the containing box, two of the three line inlets are formed in the two opposite side faces of the containing box correspondingly, and the other of the three line inlets is formed in the bottom surface of the containing box.

8. The pump component according to claim 1, wherein a detachable box cover is arranged on the side, backing onto the stator case, of the containing box.

9. The pump component according to claim 1, wherein a strong-weak electric partition board is arranged between the operation display circuit board and the motor driving circuit board.

10. The pump component according to claim 1, wherein a liquid crystal display is arranged on the operation display circuit board.

* * * * *